US011155254B2

United States Patent
Nishiwaki et al.

(10) Patent No.: US 11,155,254 B2
(45) Date of Patent: Oct. 26, 2021

(54) BRAKING DEVICE FOR VEHICLE (71) Applicant: ADVICS CO., LTD., Kariya (JP)

(72) Inventors: Kunihiro Nishiwaki, Toyota (JP);
Takayuki Yamamoto, Nagakute (JP);
Yasuhito Ishida, Toyokawa (JP);
Tatsushi Kobayashi, Kariya (JP)

(73) Assignee: ADVICS CO., LTD., Kariya (JP)

( * ) Notice: Subject to any disclaimer, the term of this patent is extended or adjusted under 35 U.S.C. 154(b) by 237 days.

(21) Appl. No.: 16/339,035

(22) PCT Filed: Oct. 4, 2017

(86) PCT No.: PCT/JP2017/036159
§ 371 (c)(1),
(2) Date: Apr. 3, 2019

(87) PCT Pub. No.: WO2018/066610
PCT Pub. Date: Apr. 12, 2018

(65) Prior Publication Data
US 2020/0039494 A1    Feb. 6, 2020

(30) Foreign Application Priority Data
Oct. 4, 2016    (JP) .............................. JP2016-196720

(51) Int. Cl.
*B60T 17/22*    (2006.01)
*B60T 7/04*    (2006.01)
(Continued)

(52) U.S. Cl.
CPC ............ *B60T 17/221* (2013.01); *B60T 7/042* (2013.01); *B60T 8/4077* (2013.01);
(Continued)

(58) Field of Classification Search
CPC ...... B60T 17/221; B60T 7/042; B60T 8/4081; B60T 8/4077; B60T 13/62; B60T 13/146; B60T 2270/82
See application file for complete search history.

(56) References Cited

U.S. PATENT DOCUMENTS

| 6,805,415 B2* | 10/2004 | Isono | ..................... B60T 8/367 303/122.03 |
| 2004/0189087 A1* | 9/2004 | Kusano | ..................... B60T 8/88 303/155 |
| 2014/0210253 A1 | 7/2014 | Okano et al. | |

FOREIGN PATENT DOCUMENTS

| CN | 103596824 A | 2/2014 |
| JP | 2004291772 A | 10/2004 |

OTHER PUBLICATIONS

International Search Report (PCT/ISA/210) and Written Opinion (PCT/ISA/237) dated Jan. 9, 2018, by the Japanese Patent Office as the International Searching Authority for International Application No. PCT/JP2017/036159.

* cited by examiner

*Primary Examiner* — Xuan Lan Nguyen
(74) *Attorney, Agent, or Firm* — Buchanan Ingersoll & Rooney PC (57) ABSTRACT

A braking device includes a stroke simulator, a hydraulic pressure generation unit, a reaction hydraulic pressure detection unit, a master hydraulic pressure detection unit, and a bottoming determination unit. The stroke simulator includes a cylinder and a piston slidably movable inside the cylinder in conjunction with an operation of a brake operation member. The stroke simulator causes a reaction force chamber to generate a reaction hydraulic pressure and applies a reaction force. The hydraulic pressure generation unit generates a master hydraulic pressure by driving a master piston
(Continued)

and supplies a hydraulic pressure to a wheel cylinder. The reaction hydraulic pressure detection unit detects the reaction hydraulic pressure. The master hydraulic pressure detection unit detects the master hydraulic pressure. The bottoming determination unit determines whether the master piston is in a bottoming state based on the reaction hydraulic pressure and the master hydraulic pressure.

12 Claims, 5 Drawing Sheets (51) Int. Cl.
    *B60T 8/40*         (2006.01)
    *B60T 13/14*      (2006.01)
    *B60T 13/62*      (2006.01)

(52) U.S. Cl.
    CPC .......... *B60T 8/4081* (2013.01); *B60T 13/146* (2013.01); *B60T 13/62* (2013.01); *B60T 2270/404* (2013.01); *B60T 2270/82* (2013.01)

BRAKING DEVICE FOR VEHICLE

TECHNICAL FIELD

The present disclosure relates to a braking device for a vehicle.

BACKGROUND ART

A braking device for a vehicle includes, by way of example, a master cylinder having a master chamber in which a master hydraulic pressure is generated by the drive of a master piston, and a wheel cylinder that generates a hydraulic pressure braking force by a hydraulic pressure based on the master hydraulic pressure. The master piston may bottom when a fade phenomenon, a failure, and the like occur. Conventionally, upon detecting such bottoming of the master piston, the master hydraulic pressure and the stroke of a brake operation member have been used. An example of a braking device for a vehicle that performs such bottoming detection is described, for example, in Japanese Unexamined Patent Application Publication No. 2004-291772.

CITATIONS LIST

Patent Literature

Patent Literature 1: Japanese Unexamined Patent Application Publication No. 2004-291772

SUMMARY OF INVENTION

Technical Problems

However, in a braking device for a vehicle equipped with a stroke simulator that applies a reaction force to the brake operation member, the bottoming may not be detected with the bottoming detection method described above depending on, for example, the size (configuration) of each unit mounted on the vehicle and the extent (vehicle situation) of fade phenomenon that occurred.

The present disclosure has been made in view of such situations, and it is an object of the present disclosure to provide a braking device for a vehicle capable of detecting bottoming of a master piston regardless of the configuration or the vehicle situation.

Solutions to Problems

A braking device for a vehicle according to the present disclosure includes a stroke simulator, a hydraulic pressure generation unit, a reaction hydraulic pressure detection unit, a master hydraulic pressure detection unit, and a bottoming determination unit. The stroke simulator includes a cylinder and a piston. The piston slidably moves inside the cylinder in conjunction with an operation of a brake operation member. The stroke simulator causes a reaction force chamber to generate a reaction hydraulic pressure and applies a reaction force corresponding to the reaction hydraulic pressure to the brake operation member. The hydraulic pressure generation unit generates a master hydraulic pressure by driving a master piston in a master cylinder in accordance with an operation of the brake operation member and supplies a hydraulic pressure based on the master hydraulic pressure to a wheel cylinder. The reaction hydraulic pressure detection unit detects the reaction hydraulic pressure. The master hydraulic pressure detection unit detects the master hydraulic pressure. The bottoming determination unit determines whether the master piston is in a bottoming state based on the reaction hydraulic pressure detected by the reaction hydraulic pressure detection unit and the master hydraulic pressure detected by the master hydraulic pressure detection unit.

Advantageous Effects of Invention

The stroke simulator may bottom before the master piston depending on the configuration and the vehicle situation. According to the present disclosure, even when the stroke simulator bottoms before the master piston, the presence or absence of the bottoming of the master piston can be determined as the reaction hydraulic pressure that increases in accordance with a further brake operation is adopted as a determination factor. That is, according to the present disclosure, the bottoming of the master piston can be detected regardless of the configuration and the vehicle situation.

DESCRIPTION OF EMBODIMENTS

Hereinafter, one embodiment in which a vehicle device according to the present disclosure is applied to a vehicle will be described with reference to the drawings. The vehicle includes a braking device A for a vehicle that applies a hydraulic pressure braking force directly to each wheel Wfl, Wfr, Wrl, Wrr (hereinafter also referred to as wheel W, front wheel Wf, rear wheel Wr in the summarized expression) to brake the vehicle.

(Overall Structure)

Figure 1:
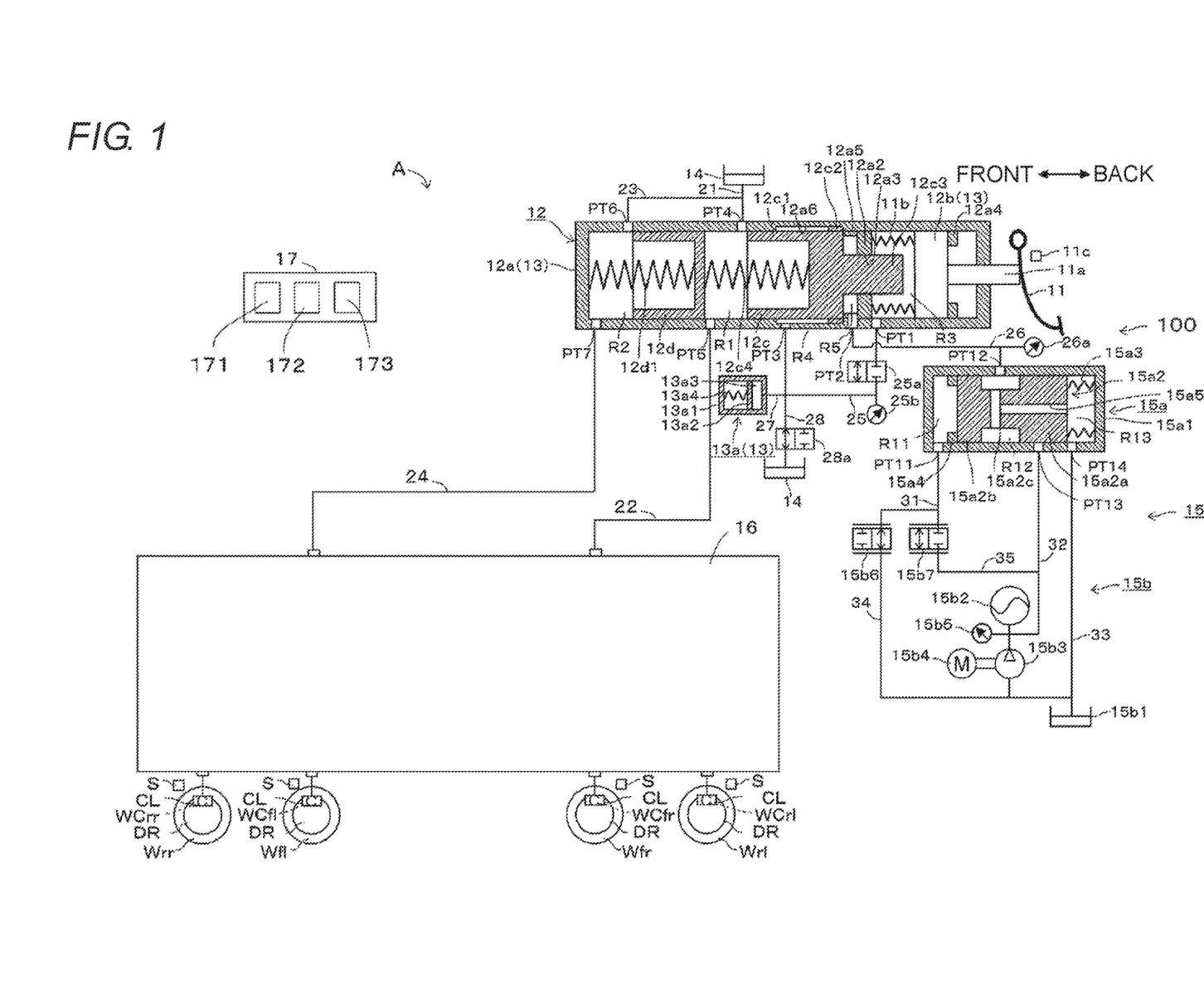
FIG. 1 is a configuration view showing a configuration of a braking device for a vehicle according to the present embodiment.

As shown in FIG. 1, the braking device A for the vehicle includes a brake pedal 11, a master cylinder 12, a reaction force generation mechanism 13, a reservoir 14, a booster mechanism 15, an actuator 16, a brake ECU 17, and wheel cylinders WCfl, WCfr, WCrl, WCrr (hereinafter also collectively referred to as wheel cylinder WC). The master cylinder 12, the booster mechanism 15, and the brake ECU 17 constitute a hydraulic pressure generation unit 100.

The wheel cylinder WC regulates the rotation of the wheel W, and is provided on each caliper CL. The wheel cylinder WC is a braking force application mechanism that applies a braking force to the wheel W of the vehicle based on the pressure (brake hydraulic pressure) of the brake fluid from the actuator 16. When the brake hydraulic pressure is supplied to the wheel cylinder WC, each piston (not shown) of the wheel cylinder WC presses a pair of brake pads (not shown), which is friction members, and sandwiches a disc rotor DR, which is a rotation member that rotates integrally with the wheel W, from both sides to regulate its rotation. A disc type brake is adopted in the present embodiment, but a drum type brake may be adopted.

The brake pedal (corresponding to "brake operation member") 11 is connected to the reaction force generation mechanism 13 and the master cylinder 12 through an operation rod 11a.

In the vicinity of the brake pedal 11, a stroke sensor (corresponding to "stroke detection unit") 11c that detects a brake pedal stroke (operation amount: hereinafter referred to as a stroke) which is a brake operation state by the depression of the brake pedal 11 is provided. The stroke sensor 11c is connected to the brake ECU 17 and outputs a detection signal (detection result) to the brake ECU 17.

The master cylinder 12 supplies brake fluid to the actuator 16 according to the stroke of the brake pedal 11, and is configured by a cylinder body 12a, an input piston 12b, a first master piston 12c, a second master piston 12d, and the like.

The cylinder body 12a is formed to a bottomed substantially cylindrical shape. A partition wall portion 12a2 projecting out to an inward flange shape is provided on the inner peripheral portion of the cylinder body 12a. A through hole 12a3 passing through in the front and back direction is formed at the center of the partition wall portion 12a2. On the inner peripheral portion of the cylinder body 12a, a first master piston 12c and a second master piston 12d are disposed so as to be liquid-tight and moveable in an axial direction at a portion on the front side of the partition wall portion 12a2.

On the inner peripheral portion of the cylinder body 12a, an input piston 12b is disposed so as to be liquid-tight and movable along the axial direction at a portion on the back side of the partition wall portion 12a2. The input piston 12b is a piston that slides within the cylinder body 12a in response to operation of the brake pedal 11.

An operation rod 11a that cooperatively operates with the brake pedal 11 is connected to the input piston 12b. The input piston 12b is biased in the direction in which a first hydraulic pressure chamber R3 is expanded by a compression spring 11b, that is, toward the back side (rightward in the drawing). When the brake pedal 11 is depressing operated, the operation rod 11a advances against the biasing force of the compression spring 11b. The input piston 12b also advances in conjunction with the advancement of the operation rod 11a. When the depressing operation of the brake pedal 11 is canceled, the input piston 12b is retracted by the biasing force of the compression spring 11b, and the input piston 12b is abutted against a restricting convex portion 12a4 to be positioned.

The first master piston 12c is integrally formed with a pressurizing tube portion 12c1, a flange portion 12c2, and a projecting portion 12c3 in order from the front side. The pressurizing tube portion 12c1 is formed to a bottomed substantially cylindrical shape having an opening on the front side and is disposed so as to be liquid-tight and slidable between the pressurizing tube portion 12c1 and the inner peripheral surface of the cylinder body 12a. A coil spring 12c4 which is a biasing member is disposed between the second master piston 12d and an internal space of the pressurizing tube portion 12c1. The first master piston 12c is biased toward the back side by the coil spring 12c4. In other words, the first master piston 12c is biased toward the back side by the coil spring 12c4, and ultimately abutted against the restricting convex portion 12a5 to be positioned. This position is the original position (preset) when the depressing operation of the brake pedal 11 is canceled.

The flange portion 12c2 is formed to have a larger diameter than the pressurizing tube portion 12c1 and is disposed so as to be liquid-tight and slidable on the inner peripheral surface of a larger diameter portion 12a6 in the cylinder body 12a. The projecting portion 12c3 is formed to have a smaller diameter than the pressurizing tube portion 12c1 and is disposed so as to liquid-tightly slide into the through hole 12a3 of the partition wall portion 12a2. A back end portion of the projecting portion 12c3 passes through the through hole 12a3 and projects out into the internal space of the cylinder body 12a and is separated from the inner peripheral surface of the cylinder body 12a. A back end face of the projecting portion 12c3 is configured to be spaced apart from the bottom surface of the input piston 12b so that its separation distance can be changed.

The second master piston 12d is disposed on the front side of the first master piston 12c in the cylinder body 12a. The second master piston 12d is formed to a bottomed substantially cylindrical shape having an opening on the front side. A coil spring 12d1, which is a biasing member, is disposed between the internal space of the second master piston 12d and the inner bottom surface of the cylinder body 12a. The second master piston 12d is biased toward the back side by the coil spring 12d1. In other words, the second master piston 12d is biased by the coil spring 12d1 toward the set original position.

In the master cylinder 12, a first master chamber R1, a second master chamber R2, a first hydraulic pressure chamber R3, a second hydraulic pressure chamber R4, and a servo chamber R5 are formed. In the description, the first master chamber R1 and the second master chamber R2 may be referred to collectively as master chambers R1, R2. The first master chamber R1 is partitioned by the inner peripheral surface of the cylinder body 12a, the first master piston 12c (front side of pressurizing tube portion 12c1), and the second master piston 12d. The first master chamber R1 is connected to the reservoir 14 through an oil passage 21 connected to a port PT4. Furthermore, the first master chamber R1 is connected to the actuator 16 through an oil passage 22 connected to a port PT5.

The second master chamber R2 is partitioned by the inner peripheral surface of the cylinder body 12a and the front side of the second master piston 12d. The second master chamber R2 is connected to the reservoir 14 through an oil passage 23 connected to a port PT6. Furthermore, the second master chamber R2 is connected to the actuator 16 through an oil passage 24 connected to a port PT7.

The first hydraulic pressure chamber R3 is formed between the partition wall portion 12a2 and the input piston 12b, and is partitioned by the inner peripheral surface of the cylinder body 12a, the partition wall portion 12a2, the projecting portion 12c3 of the first master piston 12c, and the input piston 12b. The second hydraulic pressure chamber R4 is formed on the side of the pressurizing tube portion 12c1 of the first master piston 12c and is partitioned by the inner peripheral surface of the larger diameter portion 12a6 of the inner peripheral surface of the cylinder body 12a, the pressurizing tube portion 12c1, and a flange portion 12c2. The first hydraulic pressure chamber R3 is connected to the second hydraulic pressure chamber R4 through the oil passage 25 connected to a port PT1 and the port PT3.

The servo chamber R5 is formed between the partition wall portion 12a2 and the pressurizing tube portion 12c1 of the first master piston 12c and is partitioned by an inner peripheral surface of the cylinder body 12a, the partition wall portion 12a2, the projecting portion 12c3 of the first master piston 12c, and the pressurizing tube portion 12c1. The servo chamber R5 is connected to the output chamber R12 through an oil passage 26 connected to the port PT2.

The pressure sensor 26a is a sensor that detects the servo hydraulic pressure supplied to the servo chamber R5, and is connected to the oil passage 26. The pressure sensor 26a transmits a detection signal (detection result) to the brake ECU 17. The servo hydraulic pressure detected by the pressure sensor 26a is an actual value of the hydraulic pressure of the servo chamber R5 and is hereinafter referred to as an actual servo hydraulic pressure (actual hydraulic pressure).

The reaction force generation mechanism 13 includes the cylinder body 12a, the input piston 12b, the first hydraulic pressure chamber R3, and the stroke simulator 13a in communication with the first hydraulic pressure chamber R3.

The first hydraulic pressure chamber R3 is in communication with the stroke simulator 13a through the oil passages 25 and 27 connected to the port PT1. The first hydraulic pressure chamber R3 is in communication with the reservoir 14 through a connection oil passage (not shown).

The stroke simulator 13a causes the brake pedal 11 to generate a reaction force having a magnitude corresponding to the operation state of the brake pedal 11. The stroke simulator 13a includes a cylinder 13a1, a piston 13a2, a reaction force chamber 13a3, and a spring 13a4. The piston 13a2 slidably moves in a liquid-tight manner in the cylinder 13a1 in accordance with a brake operation for operating the brake pedal 11. The reaction force chamber 13a3 is partitioned between the cylinder 13a1 and the piston 13a2. The reaction force chamber 13a3 is in communication with the first hydraulic pressure chamber R3 and the second hydraulic pressure chamber R4 through the connected oil passages 27 and 25. The spring 13a4 biases the piston 13a2 in the direction of reducing the volume of the reaction force chamber 13a3.

As described above, the stroke simulator 13a is a device that includes the cylinder 13a1, the piston 13a2 that slidably moves in the cylinder 13a1 according to the operation of the brake pedal 11, and the reaction force chamber 13a3 in which the volume changes by the movement of the piston 13a2, and generates a reaction hydraulic pressure in the reaction force chamber 13a3 according to the operation of the brake pedal 11 and applies the reaction force corresponding to the reaction hydraulic pressure to the brake pedal 11. In other words, the stroke simulator 13a is a device that includes the cylinder 13a1 and the piston 13a2 that slidably moves in the cylinder 13a1 in conjunction with the operation of the brake pedal 11, and generates a reaction hydraulic pressure in the reaction force chamber 13a3 and applies the reaction force corresponding to the reaction hydraulic pressure to the brake pedal 11. Furthermore, the master cylinder 12 includes master pistons 12c and 12d, which are driven according to the operation of the brake pedal 11, and master chambers R1 and R2 in which master hydraulic pressure is generated by driving the master pistons 12c and 12d.

A first electromagnetic valve 25a, which is an electromagnetic valve of a normally closed type, is provided in the oil passage 25. A second electromagnetic valve 28a, which is an electromagnetic valve of a normally open type, is provided in the oil passage 28 connecting the oil passage 25 and the reservoir 14. When the first electromagnetic valve 25a is in a closed state, the first hydraulic pressure chamber R3 and the second hydraulic pressure chamber R4 are blocked. Thus, the input piston 12b and the first master piston 12c cooperatively move while maintaining a constant separation distance. When the first electromagnetic valve 25a is in the open state, the first hydraulic pressure chamber R3 and the second hydraulic pressure chamber R4 are in communication with each other. Thus, the change in volume of the first hydraulic pressure chamber R3 and the second hydraulic pressure chamber R4 due to the advancement and retraction of the first master piston 12c is absorbed by the movement of the brake fluid.

A pressure sensor (corresponding to a "reaction hydraulic pressure detection unit") 25b is a sensor that detects the hydraulic pressure (reaction hydraulic pressure) of the second hydraulic pressure chamber R4, the first hydraulic pressure chamber R3, and the reaction force chamber 13a3, and is connected to the oil passage 25. The pressure sensor 25b is also an operation force sensor that detects the operation force with respect to the brake pedal 11, and has a correlation with the operation amount of the brake pedal 11. The pressure sensor 25b transmits a detection signal (detection result) to the brake ECU 17.

The booster mechanism 15 generates a servo hydraulic pressure corresponding to the operation amount of the brake pedal 11. The booster mechanism 15 is a hydraulic pressure generation device that outputs an output pressure (a servo hydraulic pressure in the present embodiment) when an input pressure (pilot pressure in the present embodiment) is acted. The booster mechanism 15 includes a regulator 15a and a pressure supply device 15b.

The regulator 15a includes a cylinder body 15a1 and a spool 15a2 that slidably moves in the cylinder body 15a1. In the regulator 15a, a pilot chamber R11, an output chamber R12, and a third hydraulic pressure chamber R13 are formed.

The pilot chamber R11 is partitioned by the cylinder body 15a1 and the front end face of the second larger diameter portion 15a2b of the spool 15a2. The pilot chamber R11 is connected to a pressure reducing valve 15b6 and a pressure increasing valve 15b7 (to the oil passage 31) connected to the port PT11. On the inner peripheral surface of the cylinder body 15a1 is provided a restricting convex portion 15a4 to which the front end face of the second larger diameter portion 15a2b of the spool 15a2 is abutted against and positioned.

The output chamber R12 is partitioned by the cylinder body 15a1, the smaller diameter portion 15a2c of the spool 15a2, the back end face of the second larger diameter portion 15a2b, and the front end face of the first larger diameter portion 15a2a. The output chamber R12 is connected to the servo chamber R5 of the master cylinder 12 through the oil passage 26 connected to a port PT12 and the port PT2. Furthermore, the output chamber R12 can be connected to the accumulator 15b2 through an oil passage 32 connected to the port PT13.

The third hydraulic pressure chamber R13 is partitioned by the cylinder body 15a1 and the back end face of the first larger diameter portion 15a2a of the spool 15a2. The third hydraulic pressure chamber R13 can be connected to the reservoir 15b1 through an oil passage 33 connected to a port PT14. In the third hydraulic pressure chamber R13, the spring 15a3 that biases the third hydraulic pressure chamber R13 in an expanding direction is provided.

The spool 15a2 includes a first larger diameter portion 15a2a, a second larger diameter portion 15a2b, and a smaller diameter portion 15a2c. The first larger diameter portion 15a2a and the second larger diameter portion 15a2b are configured to liquid-tightly slide in the cylinder body 15a1. The smaller diameter portion 15a2c is disposed between the first larger diameter portion 15a2a and the second larger diameter portion 15a2b and is integrally formed with the first larger diameter portion 15a2a and the second larger diameter portion 15a2b. The smaller diameter portion 15a2c is formed to be smaller in diameter than the first larger diameter portion 15a2a and the second larger diameter portion 15a2b.

A communication passage 15a5 is formed in the spool 15a2 to communicate the output chamber R12 and the third hydraulic pressure chamber R13.

The pressure supply device 15b is also a driving unit for driving the spool 15a2. The pressure supply device 15b includes a reservoir 15b1 which is a low pressure source, an accumulator 15b2 which is a high pressure source that accumulates brake fluid, a pump 15b3 that suctions the brake fluid of the reservoir 15b1 and sends it to the accumulator 15b2, and an electric motor 15b4 that drives the pump 15b3. The reservoir 15b1 is opened to atmosphere, and the hydraulic pressure of the reservoir 15b1 is the same as the atmospheric pressure. The pressure supply device 15b includes a pressure sensor 15b5 that detects the pressure of the brake fluid supplied from the accumulator 15b2 and outputs to the brake ECU 17.

Furthermore, the pressure supply device 15b includes the pressure reducing valve 15b6 and the pressure increasing valve 15b7. Specifically, the pressure reducing valve 15b6 is an electromagnetic valve having a structure (normally open type) that opens in a non-energized state, and the flow rate is controlled by the command of the brake ECU 17. One of the pressure reducing valves 15b6 is connected to the pilot chamber R11 through the oil passage 31 and the other of the pressure reducing valves 15b6 is connected to the reservoir 15b1 through the oil passage 34. The pressure increasing valve 15b7 is an electromagnetic valve having a structure (normally closed type) that closes in a non-energized state, and the flow rate is controlled by the command of the brake ECU 17. One of the pressure increasing valves 15b7 is connected to the pilot chamber R11 through the oil passage 31 and the other of the pressure increasing valves 15b7 is connected to the accumulator 15b2 through the oil passage 35 and the oil passage 32 to which the oil passage 35 is connected.

Here, the operation of the regulator 15a will be briefly described. When the pilot pressure (hydraulic pressure of the pilot chamber R11) is not supplied from the pressure reducing valve 15b6 and the pressure increasing valve 15b7 to the pilot chamber R11, the spool 15a2 is biased by the spring 15a3 to the original position (see FIG. 1). The original position of the spool 15a2 is a position where the front end face of the spool 15a2 abuts against the restricting convex portion 15a4 and is positioned and fixed, and is a position immediately before the back end face of the spool 15a2 closes the port PT14.

Thus, when the spool 15a2 is at the original position, the port PT14 and the port PT12 communicated with each other through the communication path 15a5, and the port PT13 is closed by the spool 15a2.

When the pilot pressure formed according to the operation amount of the brake pedal 11 is increased by the pressure reducing valve 15b6 and the pressure increasing valve 15b7, the spool 15a2 moves backward (rightward in FIG. 1) against the biasing force of the spring 15a3. Then, the spool 15a2 is moved to a position where the port PT13 closed by the spool 15a2 is opened. Furthermore, the opened port PT14 is closed by the spool 15a2. Furthermore, the opened port PT14 is closed by the spool 15a2. The position of the spool 15a2 in this state is referred to as "pressure increasing position". At this time, the back end face of the second larger diameter portion 15a2b of the spool 15a2 receives a force corresponding to the servo hydraulic pressure.

The spool 15a2 is positioned when the pressing force of the front end face of the second larger diameter portion 15a2b of the spool 15a2 and the resultant force of the force corresponding to the servo hydraulic pressure and the biasing force of the spring 15a3 are balanced. At this time, the position of the spool 15a2 is referred to as "holding position". At the holding position, the port PT13 and the port PT14 are closed by the spool 15a2.

When the pilot pressure formed according to the operation amount of the brake pedal 11 is reduced by the pressure reducing valve 15b6 and the pressure increasing valve 15b7, the spool 15a2 at the holding position moves forward by the biasing force of the spring 15a3. Then, the closed state of the port PT13 closed by the spool 15a2 is maintained. The closed port PT14 is opened. The position of the spool 15a2 in this state is referred to as "pressure reducing position". At this time, the port PT14 and the port PT12 communicate with each other through the communication path 15a5.

The booster mechanism 15 described above forms a pilot pressure according to the stroke of the brake pedal 11 by the pressure reducing valve 15b6 and the pressure increasing valve 15b7, and generates a servo hydraulic pressure corresponding to the stroke of the brake pedal 11 by the pilot pressure. The generated servo hydraulic pressure is supplied to the servo chamber R5 of the master cylinder 12, and the master cylinder 12 supplies the master hydraulic pressure generated according to the stroke of the brake pedal 11 to the wheel cylinder WC. The master hydraulic pressure is the pressure in the master chambers R1 and R2. The pressure reducing valve 15b6 and the pressure increasing valve 15b7 form a valve portion for adjusting the inflow and outflow of brake fluid to/from the servo chamber R5.

As described above, the booster mechanism 15 includes the regulator 15a with the spool 15a2 (piston) driven by a force corresponding to the pilot pressure or the hydraulic pressure in the pilot chamber R11 and a spring 15a3 (biasing portion) that biases the spool 15a2 toward a side opposite to the direction in which the spool 15a2 is driven by the force corresponding to the pilot pressure, and configured to adjust the flow rate of the brake fluid with respect to the servo chamber R5 by the movement of the spool 15a2, the pressure increasing valve 15b7 disposed between the accumulator 15b2 (high pressure source) and the pilot chamber R11, and the pressure reducing valve 15b6 disposed between the reservoir 15b1 (low pressure source) and the pilot chamber R11. The braking device A for the vehicle is configured in a by-wire system. That is, the braking device A for the vehicle is configured so that the master hydraulic pressure can be adjusted independent from the operation of the brake pedal 11, and is configured so that the fluctuation in the master hydraulic pressure does not directly affect the brake pedal 11.

The actuator 16 is a device that adjusts the upstream pressure (master hydraulic pressure) and supplies it to the downstream (wheel cylinder WC). The actuator 16 operates under the control of the brake ECU 17. Although not shown, the actuator 16 includes a plurality of electromagnetic valves, an electric pump, and a reservoir. The actuator 16 can also be said to be a device that adjusts the wheel hydraulic pressure based on the master hydraulic pressure. For example, the actuator 16 supplies the master hydraulic pressure to the wheel cylinder WC in pressure increase control, causes the brake fluid in the wheel cylinder WC to flow out to the reservoir in pressure reduction control, and seals the wheel cylinder WC in holding control.

Furthermore, the actuator 16 may be of a type capable of pressurizing control the wheel hydraulic pressure by the electric pump and the differential pressure control valve, or of a type not including the differential pressure control valve and not capable of pressurizing control. In the former type, side slip preventing control, automatic pressurization control, and the like can be performed. The detailed configuration of the actuator 16 is known and thus the description thereof will be omitted.

The braking device A for the vehicle includes a pressure sensor (corresponding to a "master hydraulic pressure detection unit") Y that detects the master hydraulic pressure. The pressure sensor Y is installed in the oil passage 22 or the oil passage 24 in the interior or the exterior of the actuator 16.

The brake ECU 17 is an electronic control unit including a CPU, a memory, and the like. The brake ECU 17 receives a detection signal from a wheel speed sensor S provided on each wheel W of the vehicle. Various sensors such as a stroke sensor 11c, pressure sensors Y and 25b, and a wheel speed sensor S are connected to the brake ECU 17. The brake ECU 17 obtains stroke information, master hydraulic pressure information, reaction hydraulic pressure information, wheel speed information, and the like from these sensors.

The brake ECU 17 sets a target servo hydraulic pressure which is a target value of the servo hydraulic pressure in accordance with the brake operation. The brake ECU 17 executes the pressure increase control, the pressure reduction control, or the holding control with respect to the booster mechanism 15 so that the actual servo hydraulic pressure approaches the target servo hydraulic pressure. In the pressure increase control, the pressure increasing valve 15b7 is in the open state and the pressure reducing valve 15b6 is in the closed state; in the pressure reduction control, the pressure increasing valve 15b7 is in the closed state and the pressure reducing valve 15b6 is in the open state; and in the holding control, the pressure reducing valve 15b6 and the pressure increasing valve 15b7 are in the closed state. A dead zone having a predetermined width is set for the target servo hydraulic pressure. Furthermore, the brake ECU 17 calculates each wheel speed, estimated vehicle body speed, slip rate and the like based on a detection signal of the wheel speed sensor S. The brake ECU 17 operates the actuator 16 based on the calculation results to execute ABS control (anti-skid control) and the like.

As described above, the braking device A for the vehicle of the present embodiment includes the stroke simulator 13a which has the reaction force chamber 13a3 in which the reaction hydraulic pressure is generated according to the operation of the brake pedal 11 and which applies a reaction force corresponding to the reaction hydraulic pressure to the brake pedal 11, the hydraulic pressure generation unit 100 which generates the master hydraulic pressure by driving the master pistons 12c, 12d in the master cylinder 12 in accordance with the operation of the brake pedal 11 and supplies the hydraulic pressure based on the master hydraulic pressure to the wheel cylinder, the actuator 16 disposed between the master chambers R1 and R2 and the wheel cylinder WC, a pressure sensor 25b that detects the reaction hydraulic pressure, and the pressure sensor Y that detects a master hydraulic pressure.

(Bottoming Determination)

The brake ECU 17 includes a control unit 171, a determination value calculation unit 172, and a bottoming determination unit 173 as functions. The control unit 171 sets a target servo hydraulic pressure based on the acquired stroke (detection result of the stroke sensor 11c) and/or the reaction hydraulic pressure (detection result of the pressure sensor 25b), and controls the booster mechanism 15 so that the actual servo hydraulic pressure approaches the target servo hydraulic pressure. When the reaction hydraulic pressure is increased even if the stroke is constant, the control unit 171 increases the target servo hydraulic pressure according to the increase in the reaction hydraulic pressure. According to such a configuration, for example, even after the stroke simulator 13a bottoms, the master hydraulic pressure is controlled to increase if there is an increase in depression of the brake pedal 11. Here, the bottoming of the stroke simulator 13a refers to a state in which the piston 13a2 has reached the movable limit position in the advancing direction. The control unit 171 controls the actuator 16 and also executes the ABS control and the like according to the situation.

The determination value calculation unit 172 calculates a "determination value", which is a determination element of the bottoming determination, based on the acquired reaction hydraulic pressure and/or stroke. Specifically, the determination value calculation unit 172 calculates the determination value based on a value (first value) weighted to the reaction force increase gradient, which is an amount of increase per unit time of the reaction hydraulic pressure, and a value (second value) weighted to the stroke increase gradient, which is an amount of increase per unit time of the stroke. More specifically, the determination value calculation unit 172 calculates the determination value based on a value (first value) obtained by multiplying a first weighting factor to the reaction force increase gradient and a value (second value) obtained by multiplying a second weighting factor to the stroke increase gradient. As an example, the determination value calculation unit 172 calculates the sum of the first value and the second value as a determination value (determination value=first value+second value). The weighting factor is a factor for weighting. The determination value calculation unit 172 increases the first weighting factor and decreases the second weighting factor as the detected stroke becomes larger. That is, the first weighting factor is set to be larger as the stroke becomes larger, and the second weighting factor is set to be smaller as the stroke becomes larger. The determination value calculation unit 172 may store a map indicating the relationship between the stroke and the first weighting factor (and/or the second weighting factor) (see, e.g., FIGS. 2 and 5 to 7).

Figure 2:
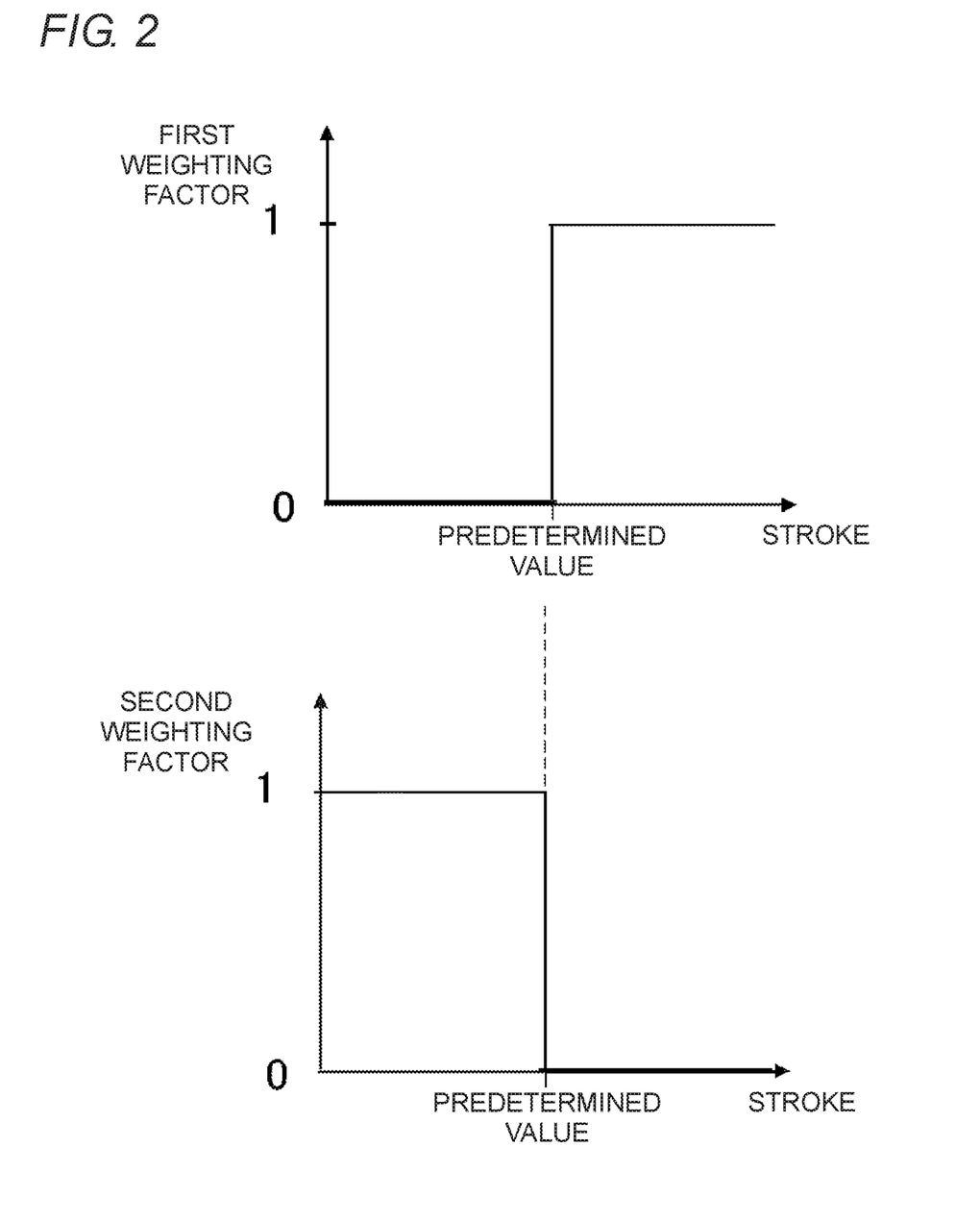
FIG. 2 is an explanatory view showing a relationship between a stroke and a weighting factor according to the present embodiment.

As shown in FIG. 2, when the stroke is less than the predetermined value, the determination value calculation unit 172 of the present embodiment sets the first weighting factor to 0 (zero) and sets the second weighting factor to 1, and when the stroke is greater than or equal to a predetermined value, the determination value calculation unit 172 sets the first weighting factor to 1 and sets the second weighting factor to 0 (zero). That is, the determination value calculation unit 172 calculates the stroke increase gradient as the determination value when the stroke is less than the predetermined value, and calculates the reaction force increase gradient as the determination value when the stroke is greater than or equal to the predetermined value. An arbitrary numerical value corresponding to the stroke may be applied to the first weighting factor and the second weighting factor. In the case of the present embodiment, the determination value calculation unit 172 can also be said to be an increase gradient calculation unit. The predetermined value is set to a value (estimated stroke) corresponding to a stroke at which the piston 13a2 of the stroke simulator 13a bottoms. The stroke at which the piston 13a2 bottoms can be obtained in advance by calculation, simulation, experiment, or the like.

The bottoming determination unit 173 determines whether or not the states of the master pistons 12c and 12d are the bottoming state based on the reaction hydraulic pressure detected by the pressure sensor 25b and the master hydraulic pressure detected by the pressure sensor Yin at least a part of the situation. The bottoming state means a state in which the master pistons 12c and 12d have reached the movable limit position in the advancing direction. The bottoming determination unit 173 according to the present embodiment performs the bottoming determination based on the determination value calculated by the determination value calculation unit 172 and the master increase gradient, which is the amount of increase per unit time of the master hydraulic pressure.

The bottoming determination unit 173 according to the present embodiment performs the bottoming determination based on the stroke increase gradient (determination value) and the master increase gradient when the stroke is less than a predetermined value, and performs the bottoming determination based on the reaction force increase gradient (determination value) and the master increase gradient when the stroke is greater than or equal to a predetermined value. The bottoming determination unit 173 determines that the master pistons 12c and 12d are in the bottoming state when the ratio (gradient ratio) of the master increase gradient with respect to the determination value is less than or equal to a predetermined ratio. That is, the bottoming determination unit 173 of the present embodiment determines that the master pistons 12c, 12d are in the bottoming state if the gradient ratio of the master increase gradient with respect to the reaction force increase gradient is less than or equal to a first predetermined ratio when the stroke is greater than or equal to a predetermined value, and determines that the master pistons 12c, 12d are in the bottoming state if the gradient ratio of the master increase gradient with respect to the stroke increase gradient is less than or equal to a second predetermined ratio when the stroke is less than a predetermined value.

The "determination of whether or not the ratio of the master increase gradient with respect to the determination value is less than or equal to a predetermined ratio" may be performed, for example, in the following manner, and is a concept including the following determination method. That is, the bottoming determination unit 173 determines that the master pistons 12c and 12d are in the bottoming state when the stroke is greater than or equal to a predetermined value, when the reaction force increase gradient is greater than or equal to a first predetermined gradient and the master increase gradient is less than or equal to a second predetermined gradient. Furthermore, the bottoming determination unit 173 determines the master pistons 12c and 12d are in the bottoming state when the stroke is less than a predetermined value, and when the stroke increase gradient is greater than or equal to a third predetermined gradient and the master increase gradient is less than or equal to a second predetermined gradient.

Figure 3:
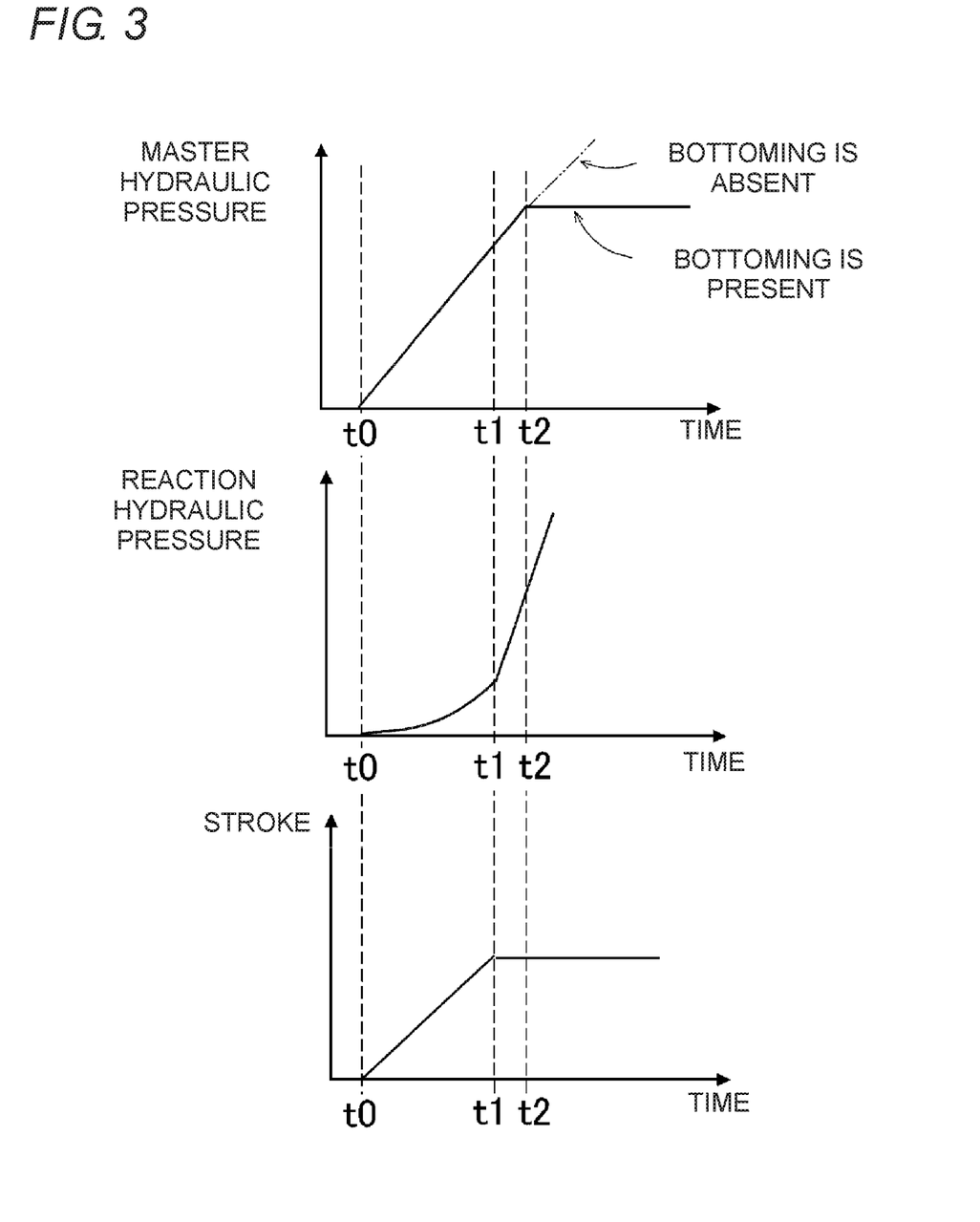
FIG. 3 is a time chart for describing an example of a bottoming determination according to the present embodiment.

Here, a detection example of bottoming when the piston 13a2 of the stroke simulator 13a bottoms before the master pistons 12c and 12d bottom will be described with reference to FIG. 3. In the example of FIG. 3, the brake pedal 11 is continuously depressed after t0. In this example, the first predetermined ratio and the second predetermined ratio are set to values slightly larger than 0 or 0.

As shown in FIG. 3, the stroke reaches a predetermined value at t1, and the piston 13a2 bottoms. At t0 to t1, the gradient ratio of the master increase gradient with respect to the stroke increase gradient (determination value) is larger than the second predetermined ratio. Therefore, during t0 to t1, the bottoming determination unit 173 determines that the master pistons 12c and 12d are not in the bottoming state. After t1, since the piston 13a2 is bottomed, the stroke increase gradient becomes 0, and the reaction force increase gradient becomes greater than the reaction force increase gradient of before t1. Due to the bottoming of the piston 13a2, the force acting on the brake fluid in the reaction force chamber 13a3 from the piston 13a2 at the time of the brake operation becomes greater than when the piston 13a2 is not in the bottoming state, and the reaction hydraulic pressure easily increases with respect to the brake operation.

At t1 to t2, the gradient ratio of the master increase gradient with respect to the reaction force increase gradient (determination value) is larger than the first predetermined ratio. Therefore, the bottoming determination unit 173 determines that the master pistons 12c and 12d are not in the bottoming state. On the other hand, when the master pistons 12c and 12d bottom at t2, the master increase gradient becomes zero although the reaction force increase gradient is large. That is, the gradient ratio of the master increase gradient with respect to the reaction force increase gradient becomes less than or equal to the first predetermined ratio. The bottoming determination unit 173 determines that the master pistons 12c and 12d are in the bottoming state after the time required for the determination from t2. That is, the brake ECU 17 detects the bottoming of the master pistons 12c and 12d even when the bottoming occurs in the stroke simulator 13a. For example, if there is no further depression of the brake pedal 11 after t2, the reaction force increase gradient also becomes 0, and the gradient ratio becomes 1, which is larger than the first predetermined ratio.

Furthermore, when setting and determining a predetermined gradient (threshold value) with respect to each increase gradient, it can be described as follows. In this example, the second predetermined gradient is set to 0, and the first and third predetermined gradients are set to values larger than 0 (e.g., values slightly larger than 0). First, at t0 to t1 in FIG. 3, the stroke increase gradient is larger than 0 and the master increase gradient is larger than the second predetermined gradient. Therefore, during t0 to t1, the bottoming determination unit 173 determines that the master pistons 12c and 12d are not in the bottoming state. After t1, since the piston 13a2 is bottomed, the stroke increase gradient becomes 0, and the reaction force increase gradient becomes greater than the reaction force increase gradient of before t1. Since the reaction force increase gradient is greater than 0 and the master increase gradient is greater than the second predetermined gradient from t1 to t2, the bottoming determination unit 173 determines that the master pistons 12c and 12d are not in the bottoming state. On the other hand, when the master pistons 12c and 12d bottom at t2, the master increase gradient becomes zero although the reaction force increase gradient is large. That is, the reaction force increase gradient is greater than or equal to the first predetermined gradient, and the master increase gradient is less than or equal to the second predetermined gradient. The bottoming determination unit 173 determines that the master pistons 12c and 12d are in the bottoming state after the time required for the determination from t2.

Figure 4:
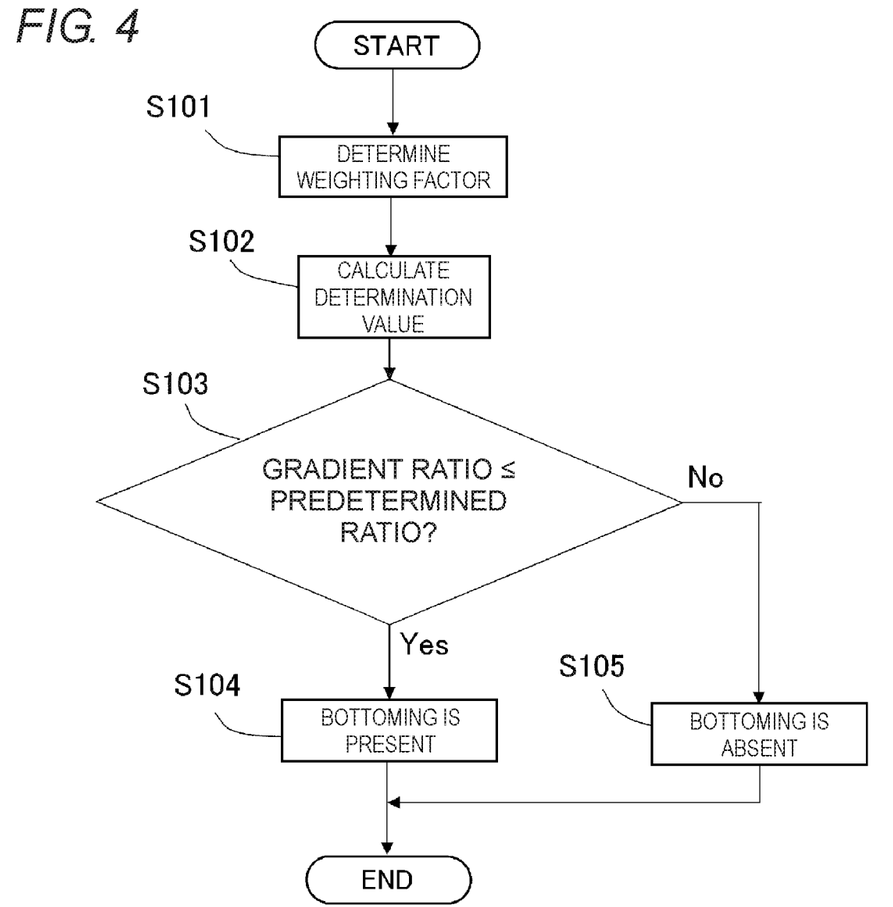
FIG. 4 is a flowchart for describing an example of the bottoming determination according to the present embodiment.

Briefly summarizing the flow of bottoming determination, as shown in FIG. 4, the determination value calculation unit 172 first refers to the map, for example, based on the acquired stroke information, and then determines the first weighting factor and the second weighting factor (S101). Then, the determination value calculation unit 172 calculates a determination value based on the first weighting factor, the second weighting factor, the stroke, and the reaction hydraulic pressure (S102). The bottoming determination unit 173 performs bottoming determination based on the determination value calculated by the determination value calculation unit 172 and the master increase gradient (S103).

If the ratio (gradient ratio) of the master increase gradient with respect to the determination value is less than or equal to the predetermined ratio (S103: Yes), the bottoming determination unit 173 determines that "bottoming is present" for the master pistons 12c and 12d (S104). That is, in this case, the brake ECU 17 detects the bottoming of the master pistons 12c and 12d. On the other hand, when the ratio of the master increase gradient with respect to the determination value is larger than the predetermined ratio (S103: No), the bottoming determination unit 173 determines that "bottoming is absent" for the master pistons 12c and 12d (S105). The determination flow of the brake ECU 17 of the present embodiment can also be described as below. That is, the brake ECU 17 determines whether or not the stroke is greater than or equal to a predetermined value, and determines the bottoming based on the stroke and the master hydraulic pressure if the stroke is less than the predetermined value, and determines the bottoming based on the reaction hydraulic pressure and the master hydraulic pressure if the stroke is greater than or equal to the predetermined value.

According to the present embodiment, by performing bottoming determination based on the reaction hydraulic pressure and the master hydraulic pressure, the presence or absence of the brake operation can be detected from the increase and decrease of the reaction hydraulic pressure even if the piston 13a2 of the stroke simulator 13a is bottomed, and thus the bottoming of the master pistons 12c and 12d can be detected. In the braking device for the vehicle provided with the stroke simulator 13a, there has been conventionally no configuration for performing bottoming determination on the assumption that the stroke simulator 13a side bottoms before the master cylinder 12 side, but this configuration is realized by the present embodiment.

Furthermore, in the present embodiment, since the bottoming determination is performed based on the stroke directly representing the brake operation and the master hydraulic pressure until the stroke reaches a predetermined value, more accurate bottoming determination can be performed. Furthermore, in the present embodiment, it is sufficient to use the existing stroke simulator 13a and pressure sensor 25b in the bottoming determination, and a pedal force sensor and the like does not need to be newly provided, which is advantageous in terms of the number of parts, manufacturing cost and saving of space.

If a fade phenomenon occurs or a failure occurs on the upstream side, there is a possibility that the master pistons 12c and 12d may bottom. Here, considering the bottoming timing, when the extent of the fade phenomenon is large, in many cases, the master pistons 12c and 12d bottom before the piston 13a2. On the other hand, when the extent of the fade phenomenon is medium, the piston 13a2 may bottom before the master pistons 12c and 12d depending on the configuration. Furthermore, for example, in the manufacture of a braking device for a large vehicle, a case in which the stroke simulator 13a of another small vehicle or medium vehicle is diverted to a large vehicle as is in terms of mounting requirement and cost. In large vehicles, the amount of fluid required around the foot is large, and the master cylinder is relatively long. Therefore, in the case of such a large vehicle, the possibility that the piston 13a2 bottoms before the master piston is relatively high in a situation where bottoming occurs. In the present embodiment, the bottoming of the master piston can be detected regardless of such a configuration and the difference in the vehicle situation (extent of fade phenomenon). Furthermore, according to the present embodiment, bottoming of the master piston can be detected without mounting a new sensor.

Figure 5:
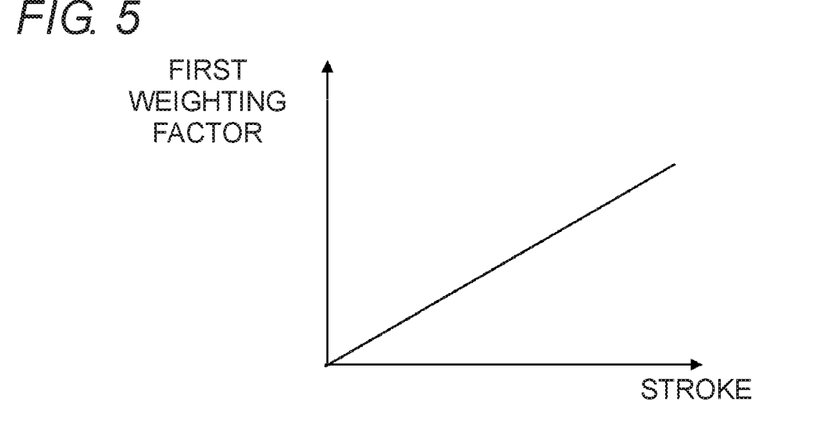
FIG. 5 is an explanatory view showing another example of the relationship between the stroke and a first weighting factor according to the present embodiment.
Figure 6:
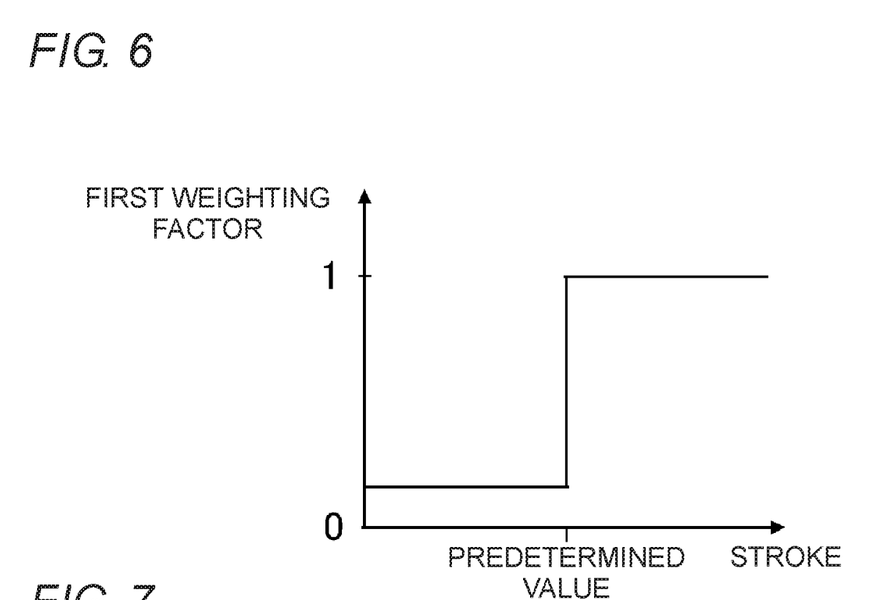
FIG. 6 is an explanatory view showing another example of the relationship between the stroke and the first weighting factor according to the present embodiment.
Figure 7:
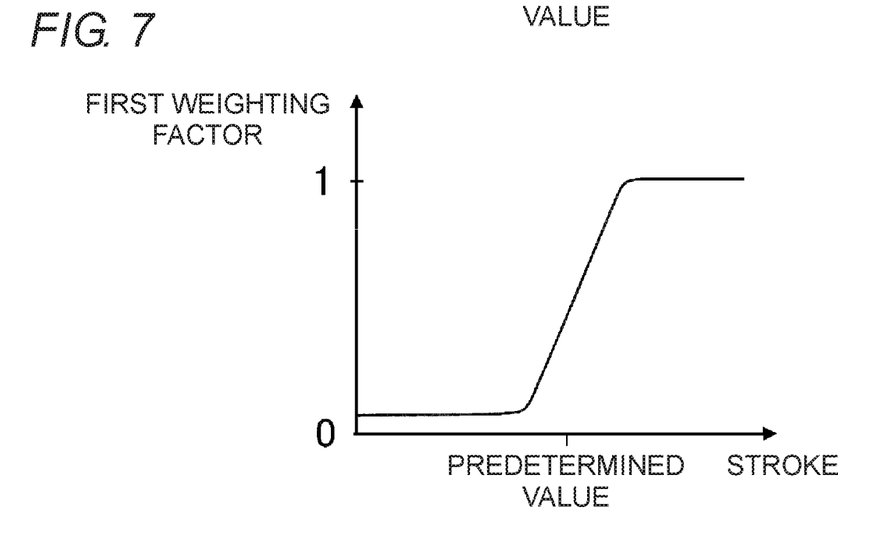
FIG. 7 is an explanatory view showing another example of the relationship between the stroke and the first weighting factor according to the present embodiment.

In the present embodiment, the proportion of the stroke making up the determination value and the reaction hydraulic pressure can be changed according to the stroke. Thus, determination values suitable for the situation can be set, and the accuracy of bottoming determination can be enhanced. For example, as shown in FIG. 5, the first weighting factor may be set to be linear (linear) with respect to the stroke. The first weighting factor may also be set in a step-like manner as shown in FIG. 6 or 7, for example, with respect to the stroke. In FIG. 6, when the stroke is less than the predetermined value, the first weighting factor is set to $\frac{1}{10}$ and the second weighting factor is set to $\frac{9}{10}$. Even when the stroke is less than a predetermined value, redundancy can be provided to the determination value by setting the first weighting factor to other than 0 (e.g., set to 0<first weighting factor<$\frac{1}{2}$). The second weighting factor may be set to a relationship opposite to FIGS. 5 to 7 (relationship in which the second weighting factor decreases as the stroke increases). Furthermore, in the relationship of FIGS. 5 to 7, for example, the second weighting factor may be set such that the sum of the first weighting factor and the second weighting factor is a constant.

Furthermore, since stroke information accurately reflects the brake operation until the piston 13a2 bottoms, in the bottoming determination at the normal time (when the piston 13a2 is in the non-bottoming state), the proportion of the stroke in the determination value is preferably half or more. That is, the second weighting factor when the stroke is less than the predetermined value is preferably greater than or equal to $\frac{1}{2}$. Furthermore, the relationship between the stroke and the weighting factor may be set, for example, to a curve shape (quadratic function etc.). Moreover, the relationship between the stroke and the weighting factor may be, for example, a combination of a plurality of functions. The first weighting factor may be set to be larger the larger the stroke is larger. The second weighting factor may be set to be smaller the larger the stroke.

In the present embodiment, the proportion in the determination value of the element in which the change amount with respect to the brake operation is large and that can clearly grasp the brake operation is increased according to the situation. That is, according to the present embodiment, the proportion of the stroke is made larger than the proportion of the reaction hydraulic pressure until the piston 13a2 bottoms, and the proportion of the reaction hydraulic pressure is made larger than the proportion of the stroke after the piston 13a2 bottoms. This enables an accurate bottoming determination.

<Others>

The present disclosure is not limited to the embodiment described above. For example, the bottoming determination unit 173 may perform the bottoming determination based on determination elements other than the stroke when the stroke is less than a predetermined value. That is, when the stroke is less than the predetermined value, the bottoming determination may be performed by a known method. However, as in the present embodiment, the bottoming determination is performed based on the stroke, the reaction hydraulic pressure, and the master hydraulic pressure, which is advantageous in terms of determination accuracy, manufacturing cost, and the like. Furthermore, the booster mechanism 15 may be an electric booster. Moreover, the predetermined ratio (first predetermined ratio or second predetermined ratio) may be set to fluctuate according to the stroke. In addition, braking device A for the vehicle may include a regenerative braking device. Furthermore, the method of calculating the determination value is not limited to the above, and for example, the calculation formula may be appropriately adjusted by adding another value to the sum of the first value and the second value, multiplying another factor, or the like. The weighting factor may be set such that the sum of the first weighting factor and the second weighting factor becomes 1, or may be other constants or variables (e.g., value different for every stroke).

The invention claimed is:

1. A braking device for a vehicle, the braking device comprising:
    a stroke simulator which has a cylinder, a piston that slidably moves inside the cylinder in conjunction with an operation of a brake operation member, and which causes a reaction force chamber within the cylinder to generate a reaction hydraulic pressure and applies a reaction force corresponding to the reaction hydraulic pressure to the brake operation member;
    a hydraulic pressure generation unit which generates a master hydraulic pressure by driving a master piston in a master cylinder in accordance with an operation of the brake operation member and supplies a hydraulic pressure based on the master hydraulic pressure to a wheel cylinder;
    a reaction hydraulic pressure detection unit that detects the reaction hydraulic pressure;
    a master hydraulic pressure detection unit that detects the master hydraulic pressure; and
    a bottoming determination unit that determines whether or not the master piston is in a bottoming state based on the reaction hydraulic pressure detected by the reaction hydraulic pressure detection unit and the master hydraulic pressure detected by the master hydraulic pressure detection unit.

2. The braking device for a vehicle according to claim 1, wherein the bottoming determination unit determines that the master piston is in the bottoming state when a gradient ratio, which is an amount of increase per unit time of the master hydraulic pressure with respect to an amount of increase per unit time of the reaction hydraulic pressure, is less than or equal to a predetermined ratio.

3. The braking device for a vehicle according to claim 1, further comprising a stroke detection unit that detects a stroke of the brake operation member,
    wherein the bottoming determination unit determines whether or not the master piston is in the bottoming state based on the reaction hydraulic pressure and the master hydraulic pressure when the stroke is greater than or equal to a predetermined value.

4. The braking device for a vehicle according to claim 1, further comprising:
    a stroke detection unit that detects a stroke of the brake operation member; and
    a determination value calculation unit that calculates a determination value based on a value weighted to a reaction force increase gradient, which is an amount of increase per unit time of the reaction hydraulic pressure, and a value weighted to a stroke increase gradient, which is an amount of increase per unit time of the stroke,
    wherein
    the determination value calculation unit increases a first weighting factor for weighting the reaction force increase gradient and decreases a second weighting factor for weighting the stroke increase gradient as the stroke becomes larger, and
    the bottoming determination unit determines whether or not the master piston is in the bottoming state based on the determination value and a master increase gradient, which is an amount of increase per unit time of the master hydraulic pressure.

5. The braking device for a vehicle according to claim 4, wherein the determination value calculation unit sets the second weighting factor to zero when the stroke is greater than or equal to a predetermined value.

6. The braking device for a vehicle according to claim 2, further comprising a stroke detection unit that detects a stroke of the brake operation member,
    wherein the bottoming determination unit determines whether or not the master piston is in the bottoming state based on the reaction hydraulic pressure and the master hydraulic pressure when the stroke is greater than or equal to a predetermined value.

7. The braking device for a vehicle according to claim 2, further comprising:
    a stroke detection unit that detects a stroke of the brake operation member; and
    a determination value calculation unit that calculates a determination value based on a value weighted to a reaction force increase gradient, which is an amount of increase per unit time of the reaction hydraulic pressure, and a value weighted to a stroke increase gradient, which is an amount of increase per unit time of the stroke,
    wherein
    the determination value calculation unit increases a first weighting factor for weighting the reaction force increase gradient and decreases a second weighting factor for weighting the stroke increase gradient as the stroke becomes larger, and
    the bottoming determination unit determines whether or not the master piston is in the bottoming state based on the determination value and a master increase gradient, which is an amount of increase per unit time of the master hydraulic pressure.

8. The braking device for a vehicle according to claim 3, further comprising:
    a stroke detection unit that detects a stroke of the brake operation member; and
    a determination value calculation unit that calculates a determination value based on a value weighted to a reaction force increase gradient, which is an amount of increase per unit time of the reaction hydraulic pressure, and a value weighted to a stroke increase gradient, which is an amount of increase per unit time of the stroke, wherein the determination value calculation unit increases a first weighting factor for weighting the reaction force increase gradient and decreases a second weighting factor for weighting the stroke increase gradient as the stroke becomes larger, and the bottoming determination unit determines whether or not the master piston is in the bottoming state based on the determination value and a master increase gradient, which is an amount of increase per unit time of the master hydraulic pressure.

9. The braking device for a vehicle according to claim 6, further comprising:

a stroke detection unit that detects a stroke of the brake operation member; and a determination value calculation unit that calculates a determination value based on a value weighted to a reaction force increase gradient, which is an amount of increase per unit time of the reaction hydraulic pressure, and a value weighted to a stroke increase gradient, which is an amount of increase per unit time of the stroke, wherein the determination value calculation unit increases a first weighting factor for weighting the reaction force increase gradient and decreases a second weighting factor for weighting the stroke increase gradient as the stroke becomes larger, and the bottoming determination unit determines whether or not the master piston is in the bottoming state based on the determination value and a master increase gradient, which is an amount of increase per unit time of the master hydraulic pressure.

10. The braking device for a vehicle according to claim 7, wherein the determination value calculation unit sets the second weighting factor to zero when the stroke is greater than or equal to a predetermined value.

11. The braking device for a vehicle according to claim 8, wherein the determination value calculation unit sets the second weighting factor to zero when the stroke is greater than or equal to a predetermined value.

12. The braking device for a vehicle according to claim 9, wherein the determination value calculation unit sets the second weighting factor to zero when the stroke is greater than or equal to a predetermined value.

\* \* \* \* \*